United States Patent [19]

Frankowski

[11] Patent Number: 4,816,966
[45] Date of Patent: Mar. 28, 1989

[54] HOUSING FOR INSTALLATION ONTO SWITCHING BOARDS

[76] Inventor: Günter Frankowski, Uhlendiekstrasse 134, D-4980 Bünde, Fed. Rep. of Germany

[21] Appl. No.: 74,836

[22] Filed: Jul. 17, 1987

[30] Foreign Application Priority Data

Jul. 18, 1986 [DE] Fed. Rep. of Germany ....... 8619379

[51] Int. Cl.⁴ .............................................. H02B 1/08
[52] U.S. Cl. .................................... 361/356; 200/295; 200/296; 248/27.1; 248/27.3; 361/346; 361/419; 361/420
[58] Field of Search ............... 200/295, 296; 248/27.1, 248/27.3; 361/346, 357, 395, 399, 417–420

[56] References Cited

U.S. PATENT DOCUMENTS 3,171,623 3/1965 Lawson et al. .................... 248/27.3
4,577,818 3/1986 Clarisse .............................. 248/27.3

FOREIGN PATENT DOCUMENTS 0777173 6/1957 United Kingdom ............... 248/27.1

Primary Examiner—A. D. Pellinen
Assistant Examiner—Gregory D. Thompson
Attorney, Agent, or Firm—Pollock, Vande Sande & Priddy

[57] ABSTRACT

A housing for installation onto switching boards with cutout slots has a front-side rim designed to overlap a cutout slot. Attachment elements constructed as sheet metal parts are mounted laterally on the housing, and are arranged for support on the back side of the switching board. The attachment elements have lateral edge areas mounted at an incline and extending at an angle diagonal to the front side of the housing. These lateral edge areas underlay correspondingly inclined, undercut areas of the housing's side wall and are affixed thereon.

9 Claims, 2 Drawing Sheets

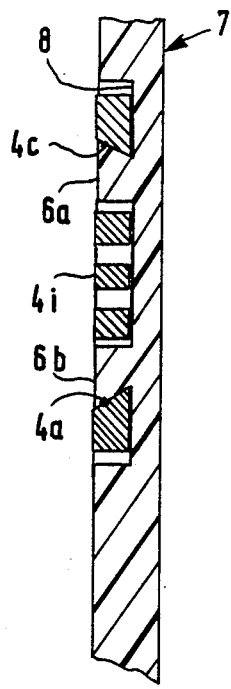
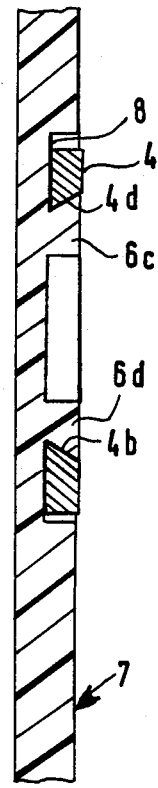
FIG. 2
FIG. 3

HOUSING FOR INSTALLATION ONTO SWITCHING BOARDS

FIELD OF THE INVENTION

The invention relates to a housing for installation onto switching boards or the like with cutout slots, with a front-side rim of the housing being designed to overlap a cutout slot. The housing has attachment elements formed as sheet metal parts mounted laterally thereon for providing support on the back side of the switching board or the like.

BACKGROUND OF THE INVENTION

In prior art switching board housing, which is made of plastic, parts made of sheet trimming are snapped together with rivet pins provided on the housing's side wall. These sheet trimming parts support a nut through which a spindle is threaded. With the help of the threaded spindle, which extends diagonally to the plane of the switching board, the housing can be affixed during assembly from the backside of the switching board in the switching board cutout slot.

A disadvantage of the known housing lies with the fact that attachment with the aid of lateral metal pegs has been proven to be too expensive.

Moreover, a further disadvantage exists in the fact that this type of housing is not suitable when insertion of the housing into the switching board takes place from the front side.

SUMMARY OF THE INVENTION

Accordingly, the present invention resolves the above-noted problems by constructing a housing of the presupplied known type in such a way that it can be produced in a particularly simple and economical manner; and, through the utilization of different attachment elements on the same housing body, the housing is suitable both for assembly from the back side as well as from the front side of the switching board.

The solution of this problem comes about through the fact that the attachment elements according to the invention have lateral edge areas -- mounted at an incline and extending at an angle diagonal to the front side of the housing—which underlay correspondingly inclined, undercut areas of the housing's side wall, on which the attachment elements are affixed.

It thereby proves practical to have recesses provided in the outer contours of the side walls of the present invention housing for receiving areas of the attachment element.

In a preferred embodiment, the areas of the attachment elements lie inside the outer contours of the side walls, with which the attachment elements rest against the bases of the recesses. According to a further aspect of the invention, the attachment elements have central openings, which are separated from one another by crosspieces which rest against molded-on projections protruding from the bases of the recesses.

In another aspect of the present invention, the attachment elements have springy elastic areas projecting away from the side wall, the front edges of the springy elastic areas pointing toward the front side of the housing being designed for mounting on the back side of the switching board.

A final aspect of the invention relates to the attachment elements having a further splice strap supported on the back side of the front-side rim.

The housing according to the invention has the advantage that the receptacles for the attachment elements are molded onto the housing, which may be made of plastic. Therefore, the previously necessary and supplemental connecting elements are not required. Moreover, the receptacles for the attachment elements are constructed in such a way that those attachment elements can be used selectively, so as to either attach the housing from the switching board's back side or from the switching board's front side.

A preferred embodiment of the invention is described with reference to the following figures.

BRIEF DESCRIPTION OF THE DRAWINGS

FIG. 2 is a cross-sectional view illustrating the inclined areas 4c and 4a adapted to undercut areas 6a and 6b, respectively, along section line II—II shown in FIG. 1; and FIG. 3 is a cross-sectional view illustrating the inclined areas 4d and 4b adapted to undercut areas 6d and 6c, respectively, along section line III—III shown in FIG. 1.

DETAILED DESCRIPTION OF THE INVENTION

Figure 1:
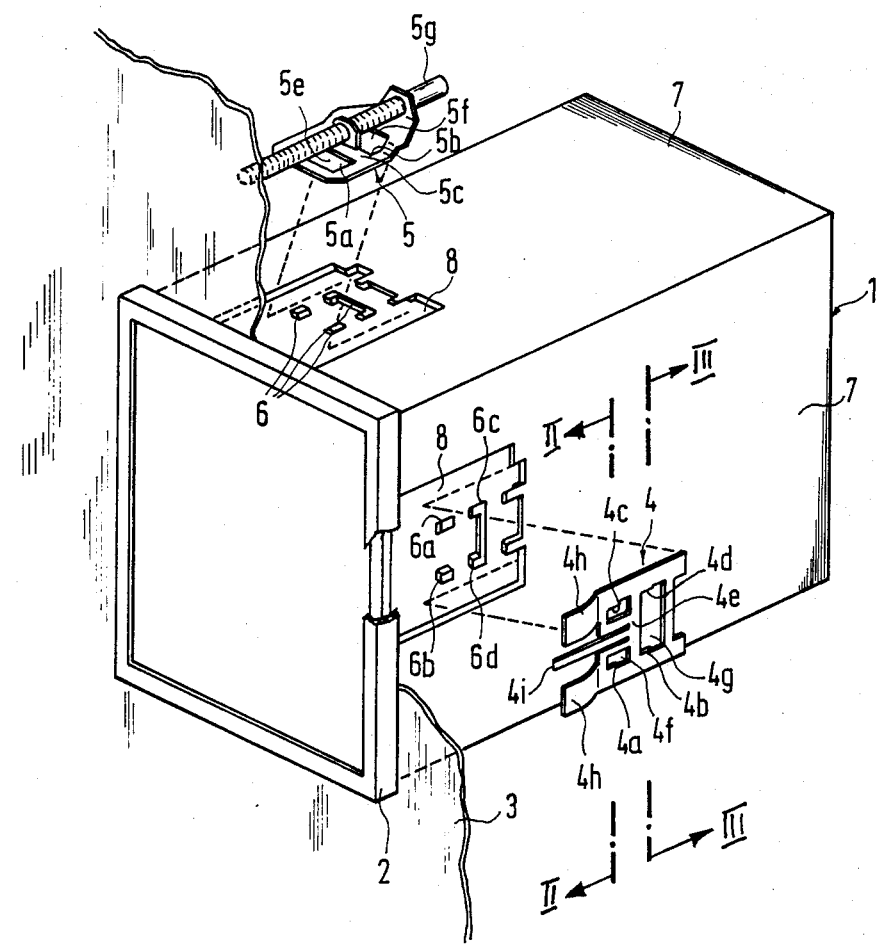
FIG. 1 shows in perspective an exploded figure of a housing with two different attachment elements.

As shown in the figure, housing 1 has side walls, 7 which have recesses 8 in the area proximate to a front-side cover frame 2. The front-side cover frame overlays a cutout slot in the switching board 3, and the housing's rim—, designated 10,—likewise overlays the cutout slot.

Molded projections 6 are provided in recesses 8. Each projection 6 has undercut areas 6a, 6b, 6c and 6d running conically to the base of the recess. These undercut areas correspond to appropriate areas of the attachment elements and secure the attachment elements when the latter are inserted into the recesses.

Attachment element 4 mounts onto the housing's side wall 7 when the housing is to be used for insertion onto the front side of switching board 3. Attachment element 4 has different openings 4f and 4g which are separated from each other by a crosspiece 4e. The openings have lateral edge areas 4a, 4b, 4c and 4d arranged at an incline and extending at an angle diagonal to the front side of the housing to conform with corresponding complementary inclined areas of undercut areas 6b, 6d, 6a and 6c, respectively. The extending lateral edge areas 4a to 4d are in fact underlaying the corresponding complementary inclined areas of the undercut areas 6a to 6d. See FIGS. 2 and 3. The incline and arrangement of the lateral edge areas are selected so that attachment element 4 can be inserted onto projections 6, by means of the enlarged open areas, before finally being slipped toward the back. The inclined lateral edge areas of attachment element 4 are then held by the corresponding complementary inclined areas of undercut areas 6a, 6b, 6c and 6d. The different projections 6 serve, moreover, to fix the attachment elements 4 in its final insert position.

Attachment element 4 has two laterally supported springy elastic areas 4h, each pointing toward the front side of the housing, and, an area 4i, otherwise designated as a splicing strap, likewise pointing toward the front side of the housing. Splicing strap 4i rests in its assembled condition against the base of recess 8 and supports itself at its front face against the not shown rim of housing 1.

With the exception of the springy elastic areas 4h, all the remaining areas of attachment element 4 lie on the inside of the outer contour of side wall 7. In such a design it is therefore enough to measure the cutout slot in the switching board 3 in such a way that the slot would correspond to the external diagonal cross-section of the housing.

The attachment element designated 5 can also be affixed to the housing. The lateral edges of openings 5e and 5f, designated 5a and 5b, respectively, work together with the corresponding undercut areas of the projection 6 of side wall 7. Housing 1 can thus be supported with spindle 5g on the back side of switching board 3. 5c is a crosspiece separating openings 5e and 5f.

I claim:

1. Housing for installation onto switching boards with cutout slots, the housing having a front-side rim designed to overlap a cutout slot of a switching board, at least one attachment element formed as a sheet metal part mounted laterally on the housing, the attachment element providing support for the housing by having at least a portion thereof abutting onto the back side of the switching board, wherein the attachment element comprises extending lateral edge areas arranged at an incline and extending at an angle diagonal to a front side of the housing, the lateral edge areas underlaying corresponding inclined, undercut areas on a side wall of the housing for affixing the attachment element to the side wall.

2. Housing according to claim 1, further comprising a recess integrated into the side wall and another recess integrated into another side wall of the housing; and wherein each recess provides receiving areas for an attachment element.

3. Housing according to claim 1, wherein the areas of the attachment element lie within a recess of the side wall, the attachment element resting against the base of the recess.

4. Housing according to claim 1, wherein the attachment element has central openings separated from one another by at least one crosspiece, the openings resting against molded-on projections protruding from the base of the recess.

5. Housing according to claim 1, wherein the attachment element has springy elastic areas projecting away from the side wall, front face edges of the springy elastic areas pointing toward the front side of the housing and are designed for mounting onto the back of the switching board.

6. Housing according to claim 5, wherein the attachment element has a splicing strap for supporting itself against the back side of the front-side rim.

7. Housing according to claim 2, wherein the areas of respective attachment elements lie within corresponding recesses of the side walls, the attachments resting against respective bases of the recesses.

8. Housing according to claim 2, wherein each attachment element has central openings separated from one another by at least one crosspiece, the openings resting against molded-on projections protruding from the base of the corresponding recess.

9. Housing according to claim 2, wherein each attachment element has springy elastic areas projecting away from its side wall, front face edges of the springy elastic areas pointing toward the front side of the housing and are designed for mounting onto the back of the switching board.

* * * * *

UNITED STATES PATENT AND TRADEMARK OFFICE
CERTIFICATE OF CORRECTION

PATENT NO. : 4,816,966
DATED      : March 28, 1989
INVENTOR(S) : GUNTER FRANKOWSKI It is certified that error appears in the above-identified patent and that said Letters Patent is hereby corrected as shown below:

On the first page of the patent, section (73), please add the following Assignee information:

-- Bopla Gehause Systeme GmbH, Bunde, Federal Republic of Germany--.

Signed and Sealed this

Sixteenth Day of January, 1990

*Attest:*

JEFFREY M. SAMUELS

*Attesting Officer*       *Acting Commissioner of Patents and Trademarks*